United States Patent Office.

JOHN G. JEFFREY, M. D., OF SOUTH NEW BERLIN, NEW YORK.

Letters Patent No. 63,902, dated April 16, 1867.

IMPROVED MEDICAL COMPOUND.

The Schedule referred to in these Letters Patent and making part of the same.

TO ALL WHOM IT MAY CONCERN:

Be it known that I, JOHN G. JEFFREY, M. D., of South New Berlin, in the county of Chenango, and State of New York, have invented a new and useful Medical Compound; and I do hereby declare that the following is a full and exact description thereof.

My improved medicine, which, from the volatile properties it contains, I term "Medicated Gas," is of the nature of a liniment, applicable by external use to all rheumatic affections, ague and fever, and other fevers resulting from malarious and climatic influences, and as a counter-irritant and stimulant in internal congestions and cholera collapse, and in all cases of prostration and great depression of the vital energies.

It is composed of the following ingredients in substantially the proportions named:

Gum guaiacum, one ounce; gum turpentine, one ounce; alum, one ounce; capsicum, one-half ounce; saltpetre, one ounce; sassafras bark, one ounce; urine of man and beast, equal parts, one gallon. The solid ingredients are finely pulverized before admixture with the liquid, and should be well shaken, when, after standing forty-eight hours, it may be kept in glass-stoppered or otherwise sealed vessels.

The mode of application will readily suggest itself in each case, but should generally be attended with friction of flannel or the hand.

What I claim as my invention is—

The improved medical compound, composed of the ingredients in substantially the proportions herein specified.

In witness whereof I have hereunto signed my name in the presence of two subscribing witnesses.

JOHN G. JEFFREY.

Witnesses:
    E. R. FULLER,
    H. M. CUSHING.